United States Patent [19]

Sedlmayr

[11] Patent Number: 4,616,850
[45] Date of Patent: Oct. 14, 1986

[54] AUTOMATIC HEIGHT ADJUSTMENT DEVICE

[75] Inventor: Gerhard Sedlmayr, Hamburg, Fed. Rep. of Germany

[73] Assignee: Autoflug GmbH, Rellingen, Fed. Rep. of Germany

[21] Appl. No.: 673,565

[22] Filed: Nov. 21, 1984

[30] Foreign Application Priority Data

Nov. 23, 1983 [DE] Fed. Rep. of Germany ....... 3342203

[51] Int. Cl.$^4$ ........................................... B60R 21/10
[52] U.S. Cl. ..................................... 280/808; 297/483
[58] Field of Search ................ 280/801, 808; 297/483, 297/486

[56] References Cited

U.S. PATENT DOCUMENTS 4,470,619  9/1984  Imajyo et al. ....................... 280/808
4,515,395  5/1985  Patterson ............................. 280/808
4,522,426  6/1985  Weman ................................. 280/808

Primary Examiner—Richard A. Bertsch
Attorney, Agent, or Firm—Becker & Becker, Inc.

[57] ABSTRACT

An apparatus for adjusting the height of the upper attachment or guide fitting for the shoulder belt of a safety belt system, particularly in motor vehicles. The apparatus has an arrangement for the preferably automatic adaptation of the height position of the attachment or guide fitting to the seated position of the person to be strapped in. A device provided in addition to the fitting senses the position of the belt strap with respect to a parameter of its operative connection to the person strapped in, and triggers a reaction to the situation ascertained. The problem exists that the height adjusting apparatus directly follows all movements of the person strapped in because of the direct coupling of condition detection and signal output. To achieve the objective, according to which the readjustment of the guide fitting should take place only with a permanent change of the seated position of the vehicle passenger, an arrangement for comparing the actual value, with respect to the selected parameter, with a fixed desired value is proposed, the reaction being triggered upon a permanent exceeding of a predetermined deviation between desired and actual value.

20 Claims, 4 Drawing Figures

AUTOMATIC HEIGHT ADJUSTMENT DEVICE

BACKGROUND OF THE INVENTION

1. Field of the Invention

The present invention relates to an apparatus for adjusting the height of the upper attachment or guide fitting for the shoulder belt of a safety belt system, particularly in motor vehicles, and comprises an arrangement for the preferably automatic adaptation of the height position of the attachment or guide fitting to the seat position of the person to be strapped in to achieve an optimum belt position; in this arrangement, in addition to the fitting, there is provided a device which senses the position of the belt strap with respect to one parameter of its operative connection with the person strapped in, and triggers a reaction to the situation ascertained.

2. Description of the Prior Art

In British Application No. 2,110,921 a device of the general type initially mentioned is described, in which the problem is to determine, after the person located on the corresponding seat of the vehicle is strapped in, a condition value concerning the direction in which the shoulder belt of the safety belt system meets the shoulder, and thus the body of the person strapped in, from its upper attachment or guide fitting. If the result is that the actual condition found does not correspond to the recommended optimum, this is signalled to the person strapped in either by an appropriate signal in such a manner that he or she reacts to it and correspondingly corrects the height position of the upper attachment or guide fitting, or the required height adjustment is carried out in a fully automatic and self-acting manner by suitable means.

However, this device has the associated drawback that the height adjustment device immediately follows all movements of the person strapped in due to the direct coupling of the detection of the actual condition and the signal emission or automatic readjustment of the fitting. Any change of the actual condition of the belt position due to even just slight or unique movements of the strappedin vehicle passengers is detected and converted into corresponding signals or automatic adjusting processes. In consequence, for example, the driver is distracted by the more or less continuous signals, and his concentration on the road traffic is thus impaired, or the fitting is continuously shifted at short intervals by a fully automatic height adjusting device.

An object of the present invention is to provide an apparatus of the general type initially mentioned in which a readjustment of the height position of the upper attachment or guide fitting is effected only on the basis of different body proportions of the respective vehicle passengers, or only with permanent changes of his or her seat position.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
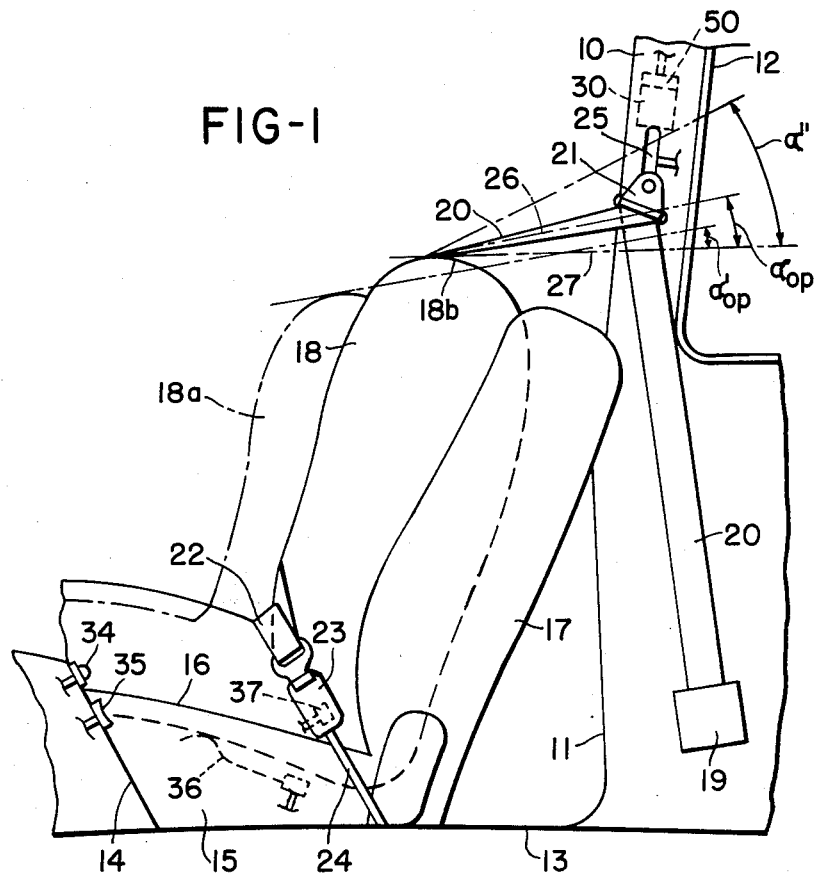
FIG. 1 schematically shows a side view of a motor vehicle front seat and the associated B-column of the car body, and the safety belt strapped on by a passenger.

The apparatus of the present invention is characterized primarily by an arrangement for comparing the actual value found with respect to the parameter or parameters selected with a fixed desired or theoretical value; the reaction is triggered if a predetermined deviation between the desired and the actual value is continuously exceeded.

Pursuant to advantageous embodiments and further inventive features, the comparison of desired and actual values may be carried out at a fixed time interval. The detection of the actual values may also take place at a fixed time interval. These time intervals may be thirty seconds.

The reaction may be triggered with at least two deviations of approximately identical magnitude, detected in the time interval.

As the parameter, an angular position may be provided which is formed by a reference line and the belt strap which runs between the upper attachment or guide fitting and the person. As the predetermined deviation, a value of six degrees may be provided, so that only angular changes above this deviation lead to triggering of the reaction.

The actual values to be supplied to the arrangement may be determined by an electric or an electronic angle measuring device, such as a rotary potentiometer or a photoelectric sensing of a slider.

As the parameter, the force may be provided with which the belt strap rests on the body, particularly on the shoulder, of the person. As the predetermined deviation, a value of one tenth of a Newton may be given, so that only changes in force above this deviation lead to triggering of the reaction.

The arrangement may emit an electrical control pulse to an adjusting member which fully automatically effects the height adjustment needed until the desired value is reached.

The arrangement may also effect the emission of a signal which can be easily detected by human senses, and which causes the person to effect a manual height adjustment of the attachment or guide fitting.

The arrangement may comprise an electronic value detector and computing system. A displacement pickup may precede an analog/digital converter unit in series, and the output of the unit, together with the output of a timing element connected to a computer in parallel with the unit, form the input for the computer which, in turn, emits a control signal. The computer with its control signal may control a servomotor for the attachment or guide fitting. Alternatively, the computer with its control signal may trigger an optical indicator or an acoustical indicator.

The comparison of the desired and actual values of the selected parameter may also be triggered by the closing of the belt buckle.

The invention has associated therewith the advantage that the vehicle passenger strapped in is able to move freely without his movement being immediately converted into corresponding signals or an automatic height adjustment of the fitting. However, as soon as the vehicle passenger changes his position, for example shifts his seat close to the steering wheel to relieve his arms, or adjusts the inclination of the backrest, and thus also causes the optimum belt position determined for his normal seat position to deviate, this deviation is detected and converted into a corresponding readjustment of the height position of the attachment or guide fitting. The same applies when another person with different body proportions enters the vehicle and utilizes the safety belt system.

The concept of permanent change in the seat position according to the invention if fulfilled in detail by the choice of the detection of the actual values of the parameter selected for the determination of the optimum belt position in time. Thus, a permanent change can be established by at least two deviations of identical magnitude, detected at a time interval, between desired and actual values, since it must then be assumed that the person strapped in has permanently changed his or her seat position, or the value is transmitted continuously, and the reaction is triggered only with a constant deviation over a predetermined freely selectable time period.

In addition, the invention makes it impossible for the reaction to be triggered by only slight deviations between desired and actual values due to the fact that deviations below a predetermined, technically meaningful value are not even detected in a manner which is significant for the checking process.

DESCRIPTION OF PREFERRED EMBODIMENTS

Referring now to the drawings in detail, according to FIG. 1, a motor vehicle body has a B-column 10, a front door opening 11, a side rear window 12, a floor 13, and a transmission cover or gear housing 14. In the region of the door opening 11, a single front seat 15, comprising the seat area 16 and the back rest 17, is arranged. The seat 15 carries a large person 18 or a small person 18a, respectively. The person is strapped in with a three-point safety belt which essentially comprises a belt takeup roller or reeling mechanism 19, a shoulder strap or belt 20, a guide fitting 21, a lap or pelvic belt 22, a belt fastener or buckle 23, and an anchoring part 24. The anchoring part 24 is flexible with inherent rigidity, and is attached to the seat 15. The seat can be adjusted into three positions.

The persons 18, 18a are shown very simplified without head or neck, since the essential feature in this case is only the position of the respective shoulder 18b, which is here met by the shoulder belt 20 from the guide fitting 21, and from where it runs in a conventional manner diagonally across the chest and abdomen of the person to the tongue of the belt buckle 23, where the blet strap is redirected in the opposite direction and is guided as lap belt 22 to the third attachment point. Since the guide fitting 21 at the B-column 10 can be adjusted in height in a slot-like guide 25, the belt strap of the shoulder belt 20 can run in a more or less inclined downward direction from the guide fitting 21 to the shoulder 18b of the respective person. The inclined position is here defined as the angle alpha, which is formed by the longitudinal central axis 26 of the tightly stretched shoulder belt 20 and an associated horizontal line 27. At least theoretically, this angle alpha has an optimum value (index op) for each size of person in conjunction with each seat position.

Figure 2:
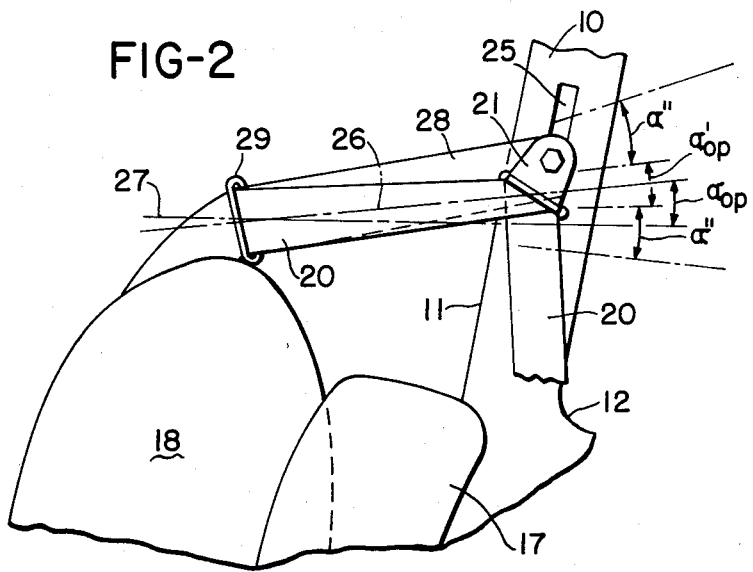
FIG. 2 shows a section from the illustration of FIG. 1 in the shoulder region of the passenger.

As can be seen from FIGS. 1 and 2, the height of the guide fitting 21 is there adjusted in such a manner that the shoulder belt 20 meets the shoulder 18b of the large person 18 at the optimum belt angle alpha op. For the small person 18a, the optimum belt angle alpha' op would be the same as for the large person 18, although for this the guide fitting 21 must be set lower in its guide 25. The belt angle alpha", which can also be seen in FIG. 1, is too large and thus disadvantageous, and must be rejected for safety reasons.

Figure 3:
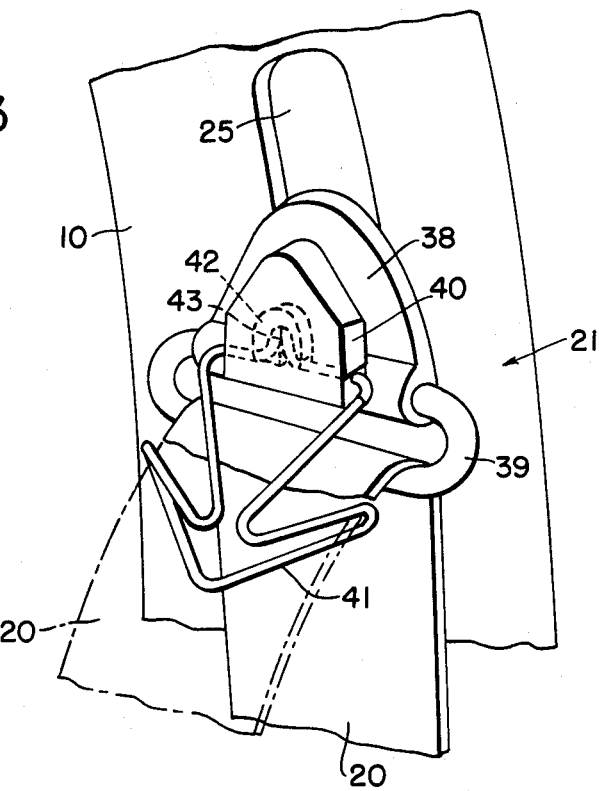
FIG. 3 shows a part of the B-column, comprising a guide fitting and device for determining the belt tension.
Figure 4:
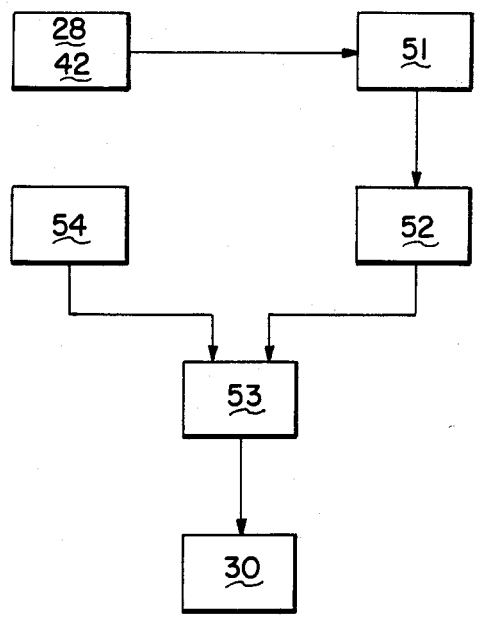
FIG. 4 shows a block diagram of the arrangement for comparing the desired and actual values for the belt position.

For the determination of the optimum belt angle, i.e. for the determination of the actual condition of the belt angle alpha and for its correction, if necessary, until the optimum, as a desired condition, is reached, sensing means are provided which can be seen in FIGS. 2 and 3. According to FIG. 2, a sensing arm 28 is pivotably mounted on the guide fitting 21. A fixed end of this arm is located coaxial with the axis of rotation of the guide fitting 21, and the free end of this arm is provided with a loop 29 through which the shoulder belt 20 is passed. When the height of the guide fitting 21 is adjusted in the guide slot 25 of the B-column 10, for example by means of an electric motor 30, the fixed end of the sensing arm 28 moves in an identical manner along the guide slot 25 upwards or downwards. Since the sensing arm 28 is connected to the guide fitting 21, on the one hand, and, indirectly, to the shoulder 18b of the person, on the other hand, the position of the sensing arm 28 defines the belt angle alpha assumed by the shoulder belt 20 as it passes along. The sensing arm is thus suitable as a measurement transmitter or indicator for the belt angle; i.e., the arm 28 makes available a corresponding parameter. This can act, for example by means of a rack and pinion connection, inductively on a displacement pickup 51 of a value detection and computing system 50 (FIG. 4).

As not shown in detail here, apart from the previously described indirect angle measurement, a direct detection of the sensing arm angle is also possible, for example by means of a rotary potentiometer or the photoelectric sensing of a slider.

According to FIG. 3, the device can also be constructed in such a manner that it is based on the force with which the belt strap of the shoulder belt 20 rests on the shoulder 18b of the person. The smaller the belt angle alpha, i.e., as a rule, the lower the setting of the height of the attachment or guide fitting at the B-column 10, the greater this force will be.

According to FIG. 3, the guide fitting 21 comprises a bracket 38 and a loop 39 for the shoulder belt 20 which is passed through the latter. The bracket 38 is supported so as to be adjustable in its height by means, not shown, in the guide slot 25 of the B-column 10. Thus far, the embodiment of FIG. 3 corresponds to that illustrated in FIGS. 1 and 2. On the outside of the bracket 38, a hood or scoop 40 is arranged which is used, on the one hand, for the pivotable support of a sensing element 41, for example bent out of wire or manufactured of plastic, and, on the other hand, for accommodating a pressure gauge 42 which is acted upon by an angular bend 43 of the sensing element 41. For the rest, the sensing element 41 has an arrow-like shape and is formed in such a manner that it encircles the top and bottom of the belt strap of the shoulder belt 20 so that even very small changes in the tension of the belt strap can be detected by the device and transmitted to the pressure gauge or sensor 42. In this arrangement, the sensing element 41 essentially also responds to the direction between the guide fitting 21 and the shoulder 18b, but the governing factor is the pressure exerted in a perceptible manner by the belt strap on the body of the person as a result of the belt position. The wrong belt angle is then also signalled by the sensor 42, thus making it possible to utilize the belt tension as a parameter for determining the actual value of the belt position.

Translation of the previously described deviation, detected by the sensing device, of the actual belt position from the optimum belt position into a corresponding reaction, either as automatic readjustment of the attachment or guide fitting 21, or as an optical and/or acoustical signal, is carried out in an electronic value detection and computing system 50, shown in the block diagram of FIG. 4, and disposed, for example, at the servomotor, 30 (FIG. 1). The movements of the sensing arm 28, or the changes at the sensor 42, respectively, are inductively detected by a displacement pickup 51 which determines the actual value of the parameter correspondingly selected. The displacement pickup 51 is followed by an analog/digital converter unit 52 in which the analog value picked up by the displacement pickup 51 is digitized for use in the computer.

The output value of the analog/digital converter unit 52 is supplied as an input value to a computer 53 in which the desired value for the belt angle recognized as optimum, and the permissible deviations from this angle, are stored. As another input, the computer 53 is supplied with the pulse from a timing element 54, which can comprise, for example, a crystal, and which every thirty seconds emits a pulse to be fed to the computer. The abovementioned magnitude of the time interval of the pulses is given only by way of example. It can be extended downwards and especially upwards without thus affecting the fundamental concept of the invention. With each input of a pulse from the timing element 54, the stored desired value and the actual values continuously entering from the analog/digital converter unit 52 are compared in the computer.

In an illustrative embodiment, not shown in greater detail, the timing element 54 is connected to the displacement pickup 51, so that even the actual-value detection takes place with a time rhythm predetermined by the timing element 54.

As soon as the computer 53 registers a permanent exceeding of the deviation, entered into it as permissible, between desired and actual value in the form of at least two successive comparison values which exceed the deviation stored, this leads to control commands being supplied as output to the servomotor 30 for the attachment or guide fitting. The control commands have such a form that they effect, on the one hand, a counter clockwise and clockwise rotation of the motor for adjusting the height of the attachment fitting 21 upwards or downwards, and that they also establish, on the other hand, the amount of motor movement and thus the amount of height adjustment. The latter can be achieved by dividing the control commands into so-called jump commands, in which arrangement, for example, one digital jump causes one rotation of the motor so that, depending on the amplitude of the desired/actual value deviation determined, a corresponding number of jump commands is provided output by the computer 53 to the motor 30.

The output value of the computer 53 can also be converted into an optical indication, for example by a lamp 34 disposed to be easily visible by the passengers, or into an acoustical signal which can also find expression in electronic speech. When the passenger sees the lamp 34 light up, and has been informed by an associated symbol or other signal about the direction in which he must adjust the guide fitting 21, he operates an appropriate switch 35 at the transmission cover 14 or at the instrument panel, not shown, in order to adjust the height of the guide fitting 21 in the guide slot 25 by means of the motor 30 until the optimum belt angle alpha has been reached. This is indicated to him by extinction of the lamp 34 or in another way. A similar process applies to the acoustical signal.

To switch off the readjusting action of the value detection and computing device 50 during the time in which the safety belt is not used, for example especially when no person is located on the seat 15, for example a seat contact switch 36 or a switch 37 built into the belt buckle 23 may be provided, both of which can also be coupled to a general signal—optical or acoustical—which signals that the safety belt as such is to be put on. In the stored position of the belt in which the belt take-up roll 19 has rolled up and tightened the belt strap in a conventional manner, so that the tongue of the buckle rests against the loop 29, the sensing arm 28 must be able to hang down along the B-column 10 so as not to interfere with entering and leaving of the vehicle, during which there must be no checking of the belt position and readjustment of the guide fitting. The value detection and computing system 50 is activated only when the person 18 sits down, for example on seat 16, and by doing so presses down the seat contact switch 36. In the device shown in FIG. 3, the control action of the sensing element 41 can be switched off in the unused position (stored position) of the safety belt either by the switches 36 or 37, already mentioned, or a lifting away from the sensor 42 can be caused, by means of the angle lever 43 being given an appropriate shape, when the belt strap of the shoulder belt 20 runs straight downwards along the B-column 10 under the action of the belt take-up roller 19.

The invention can also be implemented with rear seat belts, with which the optimum belt position must be observed just as much as with the front seat belts. If the safety belts for the rear seats are also provided with an upper attachment or guide fitting in the region of the so-called C-column of the motor vehicle, the automatic height adjustment according to the invention can also be provided at this guide fitting. If the automatic height adjusting device cannot be accommodated in the C-column for structural reasons, this can be substituted by providing an automatic height adjustment of the belt take-up roller itself if the belt is run accordingly.

In the case of so-called seat-integrated safety belts in which the belt take-up roller, belt buckle, and belt guidance are attached to the seat itself, the present invention can also be implemented by replacing the B-column 10 with the side struts of the backrest of the corresponding seat, which for this purpose are appropriately extended upwards. This also applies both to front and to back seats.

The present invention is, of course, in no way restricted to the specific disclosure of the specification and drawings, but also encompasses any modifications within the scope of the appended claims.

What I claim is:

1. An apparatus for automatically adjusting the height of the upper attachment or guide fitting for the shoulder strap of a safety belt system, said apparatus including means for adapting the height position of said attachment or guide fitting to the seated position of the person who is to be strapped in position in order to achieve an optimum belt position, and also including a sensing device associated with said attachment or guide fitting for sensing the position of said shoulder strap with respect to at least one parameter of its operative connection with the person strapped in, and for triggering a reaction from said adapting means to the situation ascertained;

the improvement comprising an arrangement including an electronic value detection and computing system operatively connected to said sensing device for comparing the actual value detected with respect to said at least one parameter with a fixed desired value, said reaction being triggered if a predetermined deviation between said desired value and said actual value is continuously exceeded so that only angular changes above this deviation lead to triggering of the reaction.

2. An apparatus for adjusting the height of the upper attachment or guide fitting for the shoulder strap of a safety belt system, said apparatus including means for adapting the height position of said attachment or guide fitting to the seated position of the person who is to be strapped in in order to achieve an optimum belt position, and also including a sensing device associated with said attachment or guide fitting for sensing the position of said shoulder strap with respect to at least one parameter of its operative connection with the person strapped in, and for triggering a reaction from said adapting means to the situation ascertained;

the improvement comprising an arrangement operatively connected to said sensing device for comparing the actual value detected with respect to said at least one parameter with a fixed desired value, said reaction being triggered if a predetermined deviation between said desired value and said actual value is continuously exceeded; the provision, as said parameter, of the angular position formed by a reference line and said shoulder strap as it runs between said attachment or guide fitting and the person; and an electrical or electronic angle measuring device associated with said sensing device for determining said actual values which are to be supplied to said arrangement.

3. An apparatus according to claim 2, in which said arrangement is adapted to carry out said comparison of desired and actual values at fixed time intervals.

4. An apparatus according to claim 3, in which said fixed time intervals are 30 seconds.

5. An apparatus according to claim 2, in which said sensing device is adapted to carry out detection of actual values at fixed time intervals.

6. An apparatus according to claim 3, in which said reaction is triggered if at least two deviations of approximately the same magnitude are detected in said time interval.

7. An apparatus according to claim 2, in which said angle measuring device is a rotary potentiometer.

8. An apparatus according to claim 2, which includes photoelectric sensing of a slider for accomplishing said angle measuring.

9. An apparatus for adjusting the height of the upper attachment or guide fitting for the shoulder strap of a safety belt system, said apparatus including means for adapting the height position of said attachment or guide fitting to the seated position of the person who is to be strapped in in order to achieve an optimum belt position, and also including a sensing device associated with said attachment or guide fitting for sensing the position of said shoulder strap with respect to at least one parameter of its operative connection with the person strapped in, and for triggering a reaction from said adapting means to the situation ascertained;

the improvement comprising an arrangement operatively connected to said sensing device for comparing the actual value detected with respect to said at least one parameter with a fixed desired value, said reaction being triggered if a predetermined deviation between said desired value and said actual value is continuously exceeded; and the provision, as said parameter, of the force with which said shoulder strap rests on the body of the person.

10. An apparatus according to claim 9, in which said predetermined deviation is one tenth of a Newton, with only changes in force greater than this deviation leading to triggering of said reaction.

11. An apparatus for adjusting the height of the upper attachment or guide fitting for the shoulder strap of a safety belt system, said apparatus including means for adapting the height position of said attachment or guide fitting to the seated position of the person who is to be strapped in in order to achieve an optimum belt position, and also including a sensing device associated with said attachment or guide fitting for sensing the position of said shoulder strap with respect to at least one parameter of its operative connection with the person strapped in, and for triggering a reaction from said adapting means to the situation ascertained;

the improvement comprising an arrangement operatively connected to said sensing device for comparing the actual value detected with respect to said at least one parameter with a fixed desired value, said reaction being triggered if a predetermined deviation between said desired value and said actual value is continuously exceeded; and an adjusting mechanism for fully automatically effecting height adjustment of said attachment of guide fitting, said arrangement being adapted to emit electrical control pulses to said adjusting mechanism to actuate the latter until said desired value is reached.

12. An apparatus for adjusting the height of the upper attachment or guide fitting for the shoulder strap of a safety belt system, said apparatus including means for adapting the height position of said attachment or guide fitting to the seated position of the person who is to be strapped in in order to achieve an optimum belt position, and also including a sensing device associated with said attachment or guide fitting for sensing the position of said shoulder strap with respect to at least one parameter of its operative connection with the person strapped in, and for triggering a reaction from said adapting means to the situation ascertained;

the improvement comprising an arrangement operatively connected to said sensing device for comparing the actual value detected with respect to said at least one parameter with a fixed desired value, said reaction being triggered if a predetermined deviation between said desired value and said actual value is continuously exceeded; said arrangement being adapted to emit a signal which can easily be detected by human senses to alert the person to effect manual height adjustment of said attachment or guide fitting.

13. An apparatus according to claim 12, which includes the provision, as said parameter, of the angular position formed by a reference line and said shoulder strap as it runs between said attachment or guide fitting and the person.

14. An apparatus according to claim 13, in which said predetermined deviation is six degrees, with only angular changes greater than this deviation leading to triggering of said reaction.

15. An apparatus for adjusting the height of the upper attachment or guide fitting for the shoulder strap of a safety belt system, said apparatus including means for adapting the height position of said attachment or guide fitting to the seated position of the person who is to be strapped in in order to achieve an optimum belt position, and also including a sensing device associated with said attachment or guide fitting for sensing the position of said shoulder strap with respect to at least one parameter of its operative connection with the person strapped in, and for triggering a reaction from said adapting means to the situation ascertained;

the improvement comprising an arrangement operatively connected to said sensing device for comparing the actual value detected with respect to said at least one parameter with a fixed desired value, said reaction being triggered if a predetermined deviation between said desired value and said actual value is continuously exceeded; said arrangement comprising an electronic value detector and computing system.

16. An apparatus according to claim 15, which includes in series a displacement pickup connected to said sensing device, and an analog/digital converter unit; and which includes a timing element, with the outputs of said converter unit and said timing element being connected in parallel to, and forming the input of, a computer, which in turn emits a control signal.

17. An apparatus according to claim 16, which includes a motor for effecting height adjustment of said attachment or guide fitting, with said control signal of said computer controlling said motor.

18. An apparatus according to claim 16, which includes an optical indicator, with said control signal of said computer triggering said optical indicator.

19. An apparatus according to claim 16, which includes an acoustical indicator, with said control signal of said computer triggering said acoustical indicator.

20. An apparatus for adjusting the height of the upper attachment or guide fitting for the shoulder strap of a safety belt system, said apparatus including means for adapting the height position of said attachment or guide fitting to the seated position of the person who is to be strapped in in order to achieve an optimum belt position, and also including a sensing device associated with said attachment or guide fitting for sensing the position of said shoulder strap with respect to at least one parameter of its operative connection with the person strapped in, and for triggering a reaction from said adapting means to the situation ascertained;

the improvement comprising an arrangement operatively connected to said sensing device for comparing the actual value detected with respect to said at least one parameter with a fixed desired value, said reaction being triggered if a predetermined deviation between said desired value and said actual value is continuously exceeded; said safety belt including a buckle, with closing of said buckle being adapted to trigger said comparison of desired and actual values.

* * * * *